(12) United States Patent
Cecchinato et al.

(10) Patent No.: US 6,595,237 B2
(45) Date of Patent: Jul. 22, 2003

(54) PRESSURE REGULATOR FOR GAS TRANSPORT AND DISTRIBUTION PLANTS

(75) Inventors: Umberto Cecchinato, Quinto Vicentino (IT); Claudio Imboccioli, Creazzo (IT)

(73) Assignee: Pietro Florentini SpA, Milan (IT)

( * ) Notice: Subject to any disclaimer, the term of this patent is extended or adjusted under 35 U.S.C. 154(b) by 23 days.

(21) Appl. No.: 09/959,595

(22) PCT Filed: Jul. 13, 2001

(86) PCT No.: PCT/EP01/08100

§ 371 (c)(1),
(2), (4) Date: Oct. 31, 2001

(87) PCT Pub. No.: WO02/06912

PCT Pub. Date: Jan. 24, 2002

(65) Prior Publication Data

US 2003/0098071 A1 May 29, 2003

(30) Foreign Application Priority Data

Jul. 17, 2000 (IT) ........................................ VI00A000148

(51) Int. Cl.⁷ ................................................ G05D 16/16
(52) U.S. Cl. ..................... 137/489.5; 137/488; 137/489
(58) Field of Search ................................ 137/488, 489, 137/489.5; 251/61.2, 61.4

(56) References Cited

U.S. PATENT DOCUMENTS

| | | | |
|---|---|---|---|
| 1,987,505 A | * | 1/1935 | Edler .......................... 137/488 |
| 2,059,121 A | * | 10/1936 | Lake .......................... 137/489 |
| 2,309,848 A | | 2/1943 | King |
| 3,139,899 A | * | 7/1964 | Schwerter ................. 137/489.5 |
| 3,794,062 A | | 2/1974 | AuWerter |
| 5,056,550 A | | 10/1991 | Mooney |
| 5,348,036 A | * | 9/1994 | Oksanen et al. ............. 137/488 |
| 5,967,176 A | | 10/1999 | Blann et al. |
| 6,173,735 B1 | * | 1/2001 | Perry et al. ................. 137/489 |

FOREIGN PATENT DOCUMENTS

| | | | |
|---|---|---|---|
| EP | 0 522 434 A1 | * | 1/1993 |
| EP | 0 683 444 A1 | * | 11/1995 |
| FR | 1582851 | | 10/1969 |
| JP | 02245908 | | 1/1990 |

* cited by examiner

Primary Examiner—Michael Powell Buiz
Assistant Examiner—Ramesh Krishnamurthy
(74) Attorney, Agent, or Firm—Dykema Gossett

(57) ABSTRACT

The invention relates to a gas pressure regulator having a valve, a delivery duct of low pressure gas (Pb), a regulation shutter for the gas delivery flow, a control head of the valve defining an upper chamber [(9)] and a lower chamber. A pilot valve controls the movement of the shutter. The pilot valve has a first chamber with an inlet way, a first outlet way communicating with said delivery duct and a second chamber in which there is the body of an interception shutter adapted to open or close the inlet way [(14)]. The first chamber has at least a second outlet way communicating with the lower chamber and the upper chamber and the inlet way are connected to each other through an auxiliary duct containing gas at an intermediate pressure (Pm) between high pressure (Pa) and low pressure (Pb).

11 Claims, 8 Drawing Sheets

PRESSURE REGULATOR FOR GAS TRANSPORT AND DISTRIBUTION PLANTS

BACKGROUND

The present invention relates to a pressure regulator, particularly adapted to be installed in transport and distribution plants for natural gas.

It is well known that natural gas lifted at high pressure from reservoirs, is supplied to the user's intake by proper transport and distribution plants.

These plants provide for delivering safely the combustible gas warranting delivery continuity and control of the delivery pressure value.

Said plants comprise a safety device consisting of a piloted pressure reducer of the Fail To Close (FTC) type, called also monitor, followed by a pressure regulator of the Fail To Open (FTO) type.

This configuration allows to supply gas to the user even when the FTO regulator fails.

Indeed in this condition the FTO regulator keeps open the gas inflow channel, assigning to the FTC monitor the task to regulate properly the gas delivery pressure, which is kept thereby just above the value set for the FTO regulator, but anyway within the safety limits.

If the monitor fails, it closes the high pressure gas inflow to the user so as to avoid accidents.

A known FTO pressure regulator is shown in FIG. 1, where one can see that it comprises a valve R having an inlet duct I for the high pressure gas and a delivery duct M for the low pressure gas, a regulation shutter O being arranged inbetween controlling the gas flow coming from the inlet duct I and therefore the gas delivery pressure.

The regulation shutter O is slidingly supported by a stem A fixed to an elastic membrane E belonging to the control head T in which the membrane defines a lower chamber Ci and an upper chamber Cs, the latter being connected to the delivery duct M.

The movement of the regulation shutter O is controlled through an auxiliary regulator Ra having an inlet way V connected to a duct F containing the gas under an intermediate pressure between high and low pressure, and an outlet way U communicating through a connection duct G with the lower chamber Ci of the control head T, feeding the reference pressure of regulator R.

The operation of the regulator provides that the shutter O is moved to change the gas delivery flow as a function of the difference between the gas delivery pressure and the gas reference pressure existing in the lower chamber Ci.

In order to calibrate the system, gas pressure in the lower chamber of the control head is set and the operator acts on the auxiliary regulator Ra so that the shutter remains substantially stationary when the delivery pressure is coincident with the desired pressure.

In this way the operation of the system provides that if the forces acting on the head are equal, the shutter remains stationary, while when the force exerted by the gas delivery pressure is lower than the desired value, the shutter opens increasing the high pressure gas flow and therefore increasing the gas delivery pressure until the two opposite pressures are again balanced.

Conversely an increase of the gas delivery pressure acts on the control head so as to impose to the regulation shutter a closure movement of the inlet duct for the high pressure gas with consequent decrease of the gas delivery pressure.

A first drawback of the above mentioned regulator R consists in that with a temperature variation the quantity of gas contained in the connection duct G between the auxiliary regulator Ra and the lower chamber Ci of the control head R, is varied thus causing variation of the gas delivery pressure.

As a matter of fact the duct G and the lower chamber Ci define a closed volume inside which gas is contained and it is well known that when temperature increases, also gas own pressure increases so as to cause a wrong opening of the regulation shutter O and therefore an increase of the gas delivery pressure.

The prior art in order to solve partially this problem, provides for installing an auxiliary tank S shown in dash lines constituting a volume of thermal dispersion connected to the connection duct G.

In order to further reduce the problems arising from the thermal drift, the prior art provides for isolating thermally both the connection duct G and the auxiliary tank S.

Another drawback of the described prior art consists in that pressure may increase to such an extent to become dangerous for the defined chamber.

In order to overcome such a drawback the prior art provides for installing a relief valve D shown in dash lines arranged on the connection duct G which is automatically actuated when gas inside the duct G exceeds a predetermined threshold pressure.

This solution however has a further drawback consisting in that gas is dispersed to atmosphere with fire and/or deflagration risks, jointly with the economic loss arising from the gas waste.

A further drawback of both prior art solutions, consists in that the thermal drift requires a frequent new calibration.

In order to solve the above mentioned drawbacks the prior art provides for using a different regulator of the FTO type shown in FIG. 2 which is different from the preceding one for the different feedback on the regulation valve R.

More particularly the system provides for placing a lamination valve Va provided with an inlet way Vi for the high pressure gas and two outlet ways U1 and U2: the first way U1 is connected to the upper chamber Cs of the regulation valve R1 and the second way U2 is connected to the inlet Pi of a pilot valve P. More particularly in the pilot valve P there is a first chamber B1 connected to the inlet way Pi and a second chamber B2 connected to a delivery duct M for the low pressure gas in which there is the plug of an interception shutter OP opening or closing the inlet way Pi.

The first chamber B1 has also an outlet way U3 communicating with the delivery duct M through a connection duct G1.

It is important to note that on the membrane E forces exerted by pressure of high pressure gas and by the gas contained in outlet V1 of the lamination valve Va are acting.

The operation of the FTO regulator provides that when downstream pressure rises above the desired limit, the pilot valve P closes the inlet way Pi preventing gas lamination by the lamination valve Va. This causes inflow of high pressure gas to the upper chamber Cs of the control head T and closes the inlet way I of the regulation valve R, so as to increase the downstream pressure.

Conversely with a decrease of the gas delivery pressure, shutter OP opens so as to allow inflow to the delivery duct M of gas coming from the inlet way Pi of the pilot valve P.

This allows gas lamination in the lamination valve Va and therefore decrease of pressure inside the upper chamber Cs of the control head. Consequently opening of the shutter O of the regulation valve R will occur, causing the gas delivery pressure to increase.

A drawback of the described prior art consists in that the regulation unit and the upstream regulator of the monitor FTC type are different from each other, so that they do not have interchangeable elements and cannot use common spare parts. This obliges the user to keep on stock a bigger quantity of spare parts and provide for a greater and differentiated training of the maintenance staff.

SUMMARY OF THE INVENTION

An object of the invention is to overcome said drawbacks.

More particularly a first object is to provide a pressure regulator having components that are interchangeable with the components of the upstream pressure regulator of the monitor FTC type.

Another object is to provide a pressure regulator keeping the gas delivery pressure constant when the operative temperatures of the regulation units are varying.

A further object is to provide a regulator in which the calibration is easy to be effected and must be carried out only once at the first start up stage.

A further object is to remove the fire and deflagration risks arising from an increase of the temperature of the entire regulation unit.

A last but not least object is to provide a regulator which is particularly simple to be used and installed.

The foregoing objects are attained by a gas pressure regulator that according to the main claim comprises:

at least a valve having an inlet duct for the high pressure gas Pa, at least a delivery duct for low pressure gas Pb and a shutter regulating the delivery flow of said gas slidingly supported by a stem fixed to an elastic membrane belonging to a control head of said valve and defining an upper chamber and a lower chamber;

at least a pilot valve for controlling the movement of said regulation shutter defining a first chamber with a first outlet way communicating with said delivery duct and a second chamber connected to said delivery duct in which the plug of an interception shutter adapted to open or close said inlet way is arranged;

said regulator being characterized in that said first chamber has at least a second outlet way communicating with said lower chamber and said upper chamber and first chamber are connected to each other through an auxiliary duct containing gas at an intermediate pressure Pm between said high pressure Pa and low pressure Pb.

Advantageously the regulator of the invention allows to convey in the delivery duct the excess gas at the high pressure developing inside the piloting duct.

BRIEF DESCRIPTION OF THE DRAWINGS

The foregoing objects will be better understood from the following description of the preferred embodiment which is given as an illustrative and non-limiting example making reference to the accompanying sheets of drawings in which.

DETAILED DESCRIPTION

Figure 1:
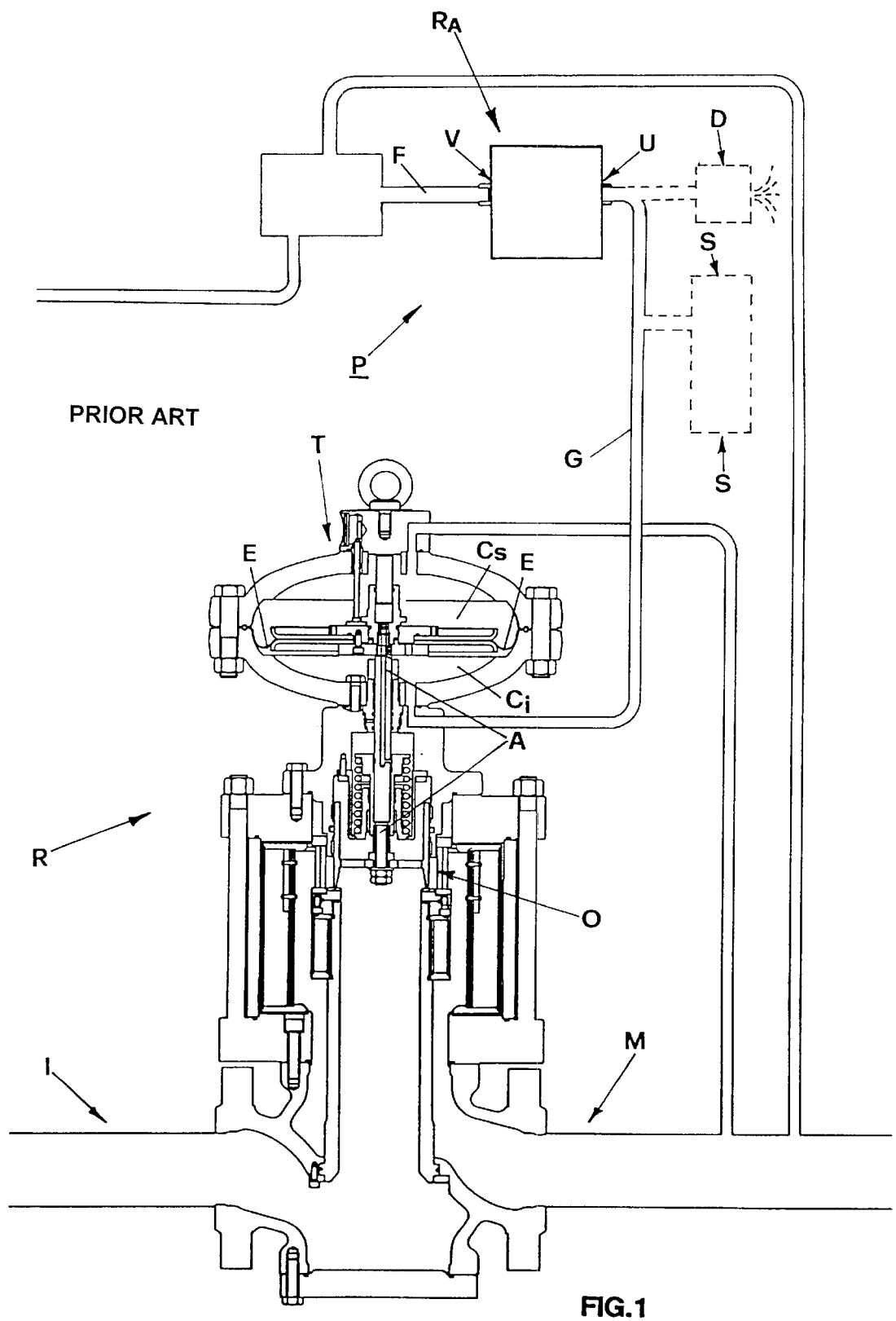
FIG. 1 is general sectional view of a prior art regulator.
Figure 2:
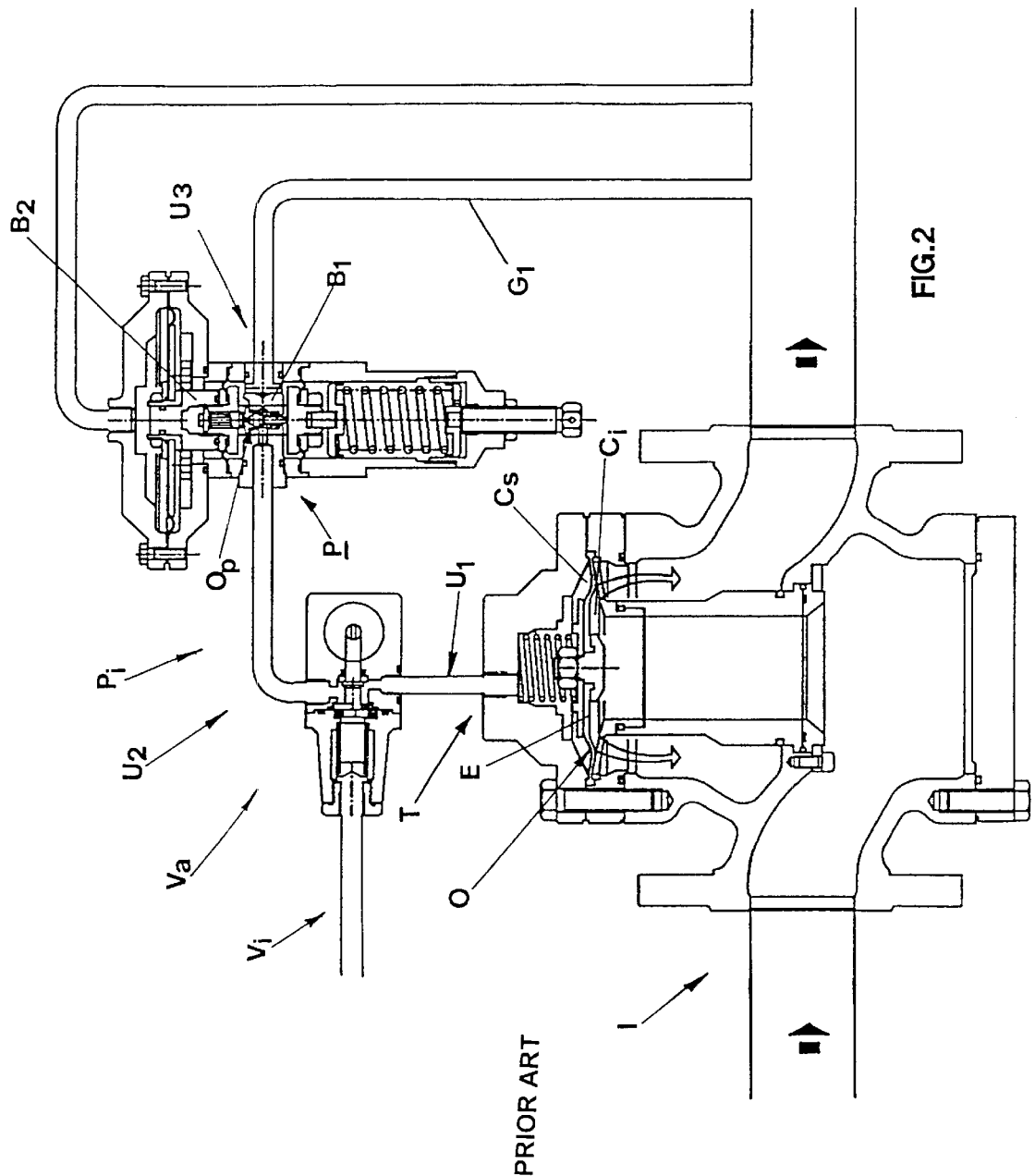
FIG. 2 is a general sectional view of another prior art regulator.
Figure 3:
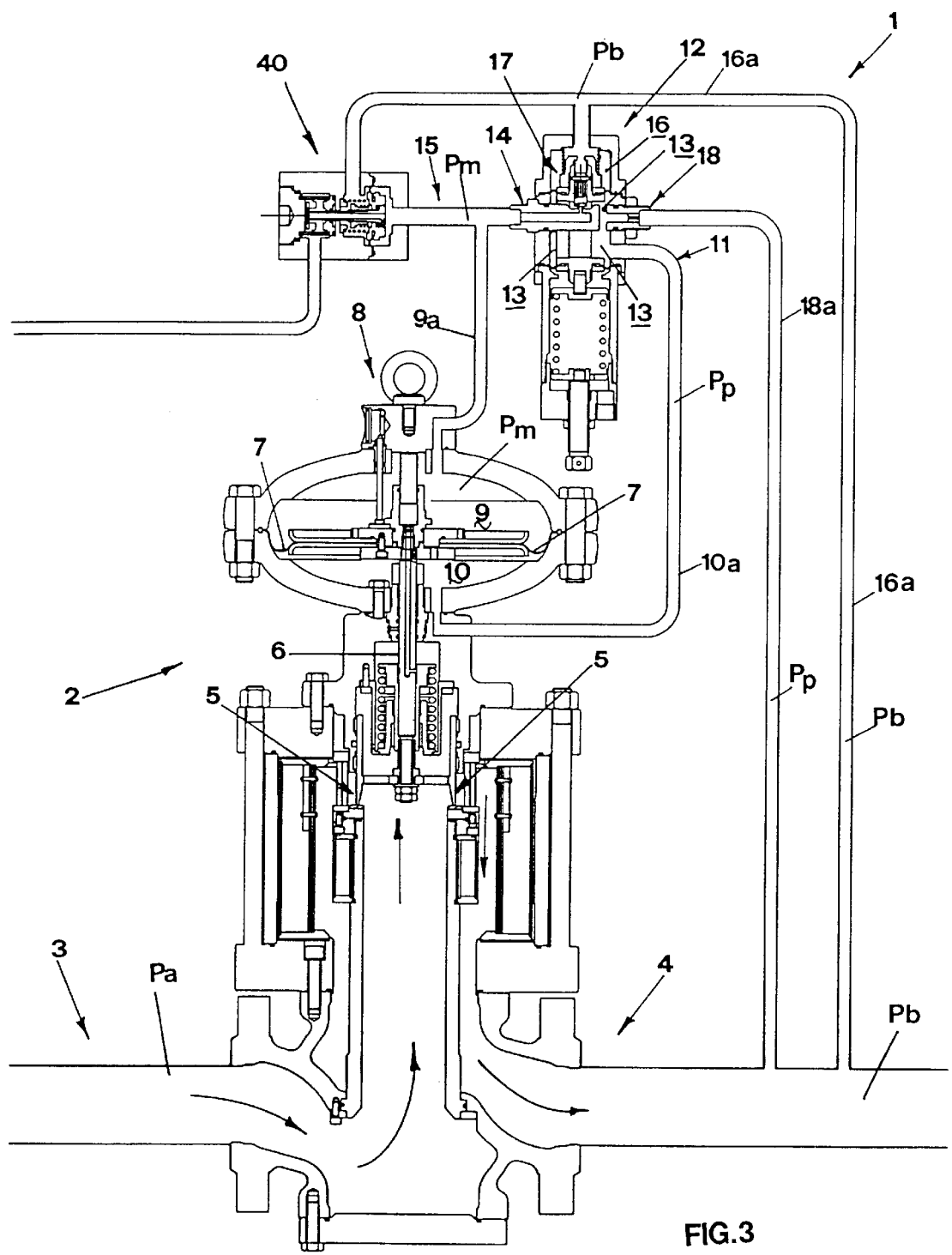
FIG. 3 is a general sectional view of the regulator of the present invention.
Figure 4:
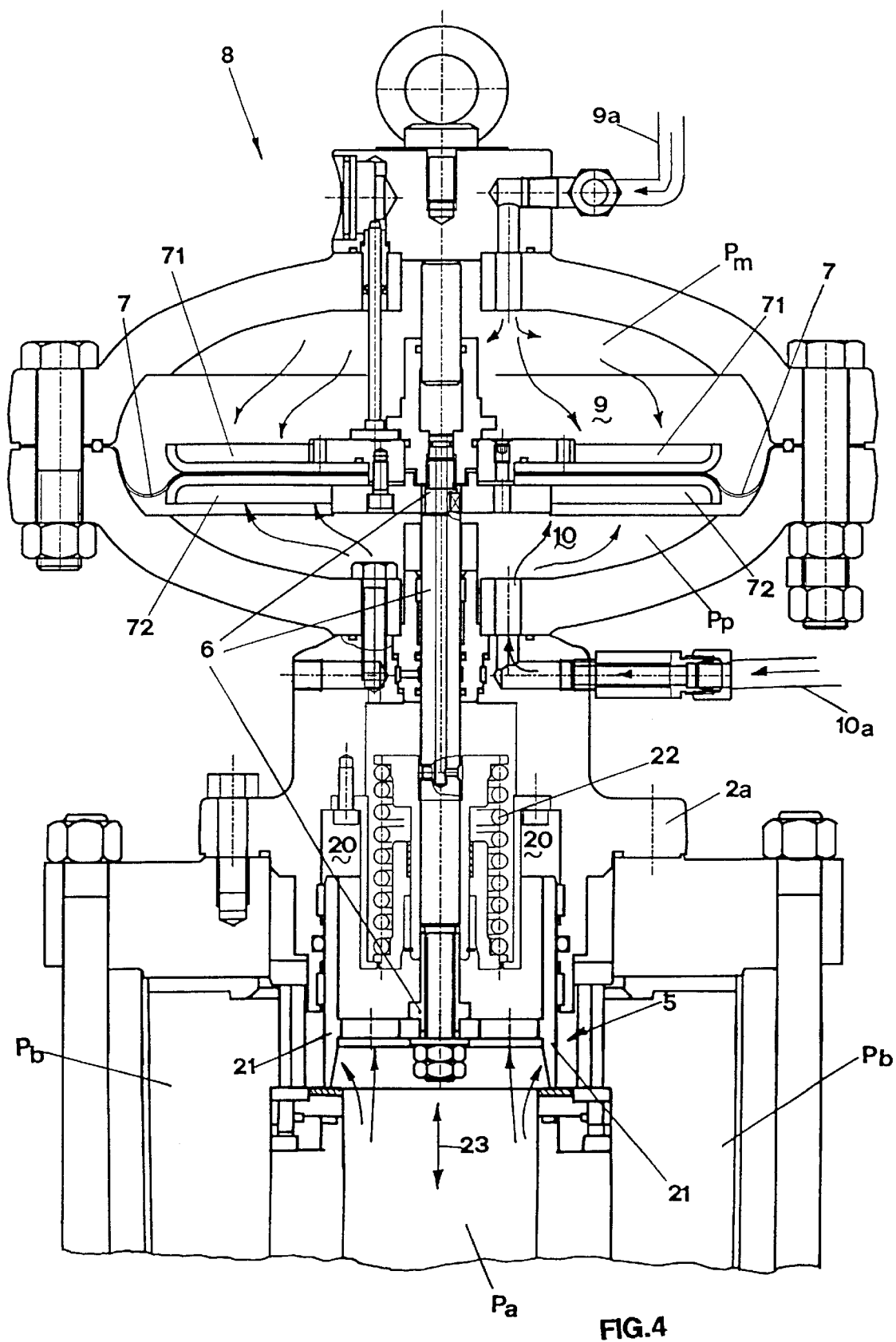
FIGS. 4 and 5 are sectional views of a detail of the unit of FIG. 3 in two different working positions.

The regulator of the invention is shown in FIG. 3 where is generally indicated with reference numeral 1; the regulator comprises a valve 2 having an inlet duct 3 for the high pressure gas Pa, a delivery duct 4 for low pressure gas Pb and a regulation shutter generally indicated with reference numeral 5, to reduce and regulate the gas delivery pressure. Shutter 5 is slidingly supported by a stem 6, connected to an elastic membrane 7 belonging to the control head 8 of said regulator 2. The membrane defines inside the head 8 an upper chamber 9 and a lower chamber 10, the latter being connected through a pipe 10a to a first outlet way 11 of a pilot valve 12 for controlling the movement of the shutter 5.

Figure 6:
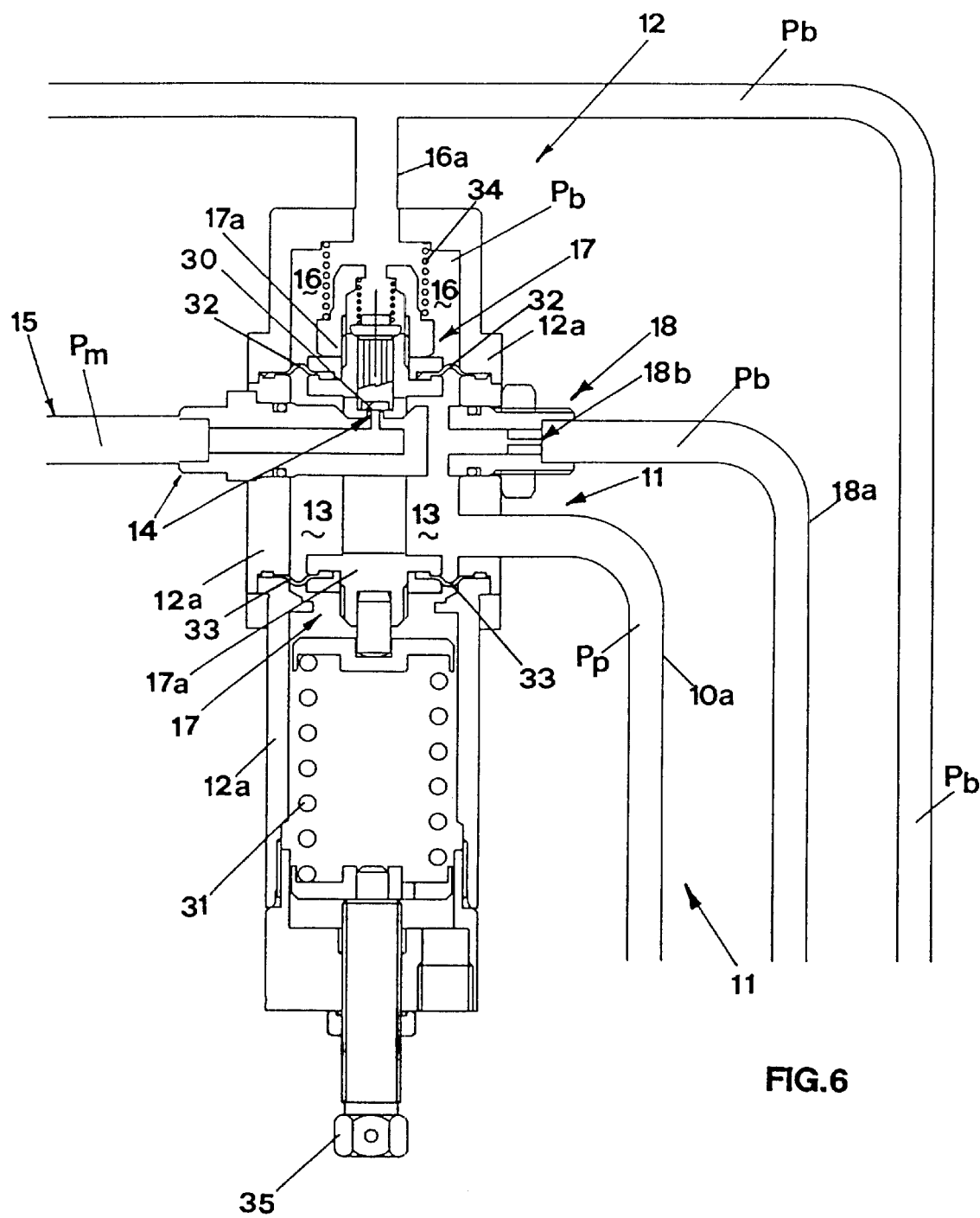
FIGS. 6 and 7 are sectional views of another detail of the unit of FIG. 3 in two different working positions.
Figure 7:
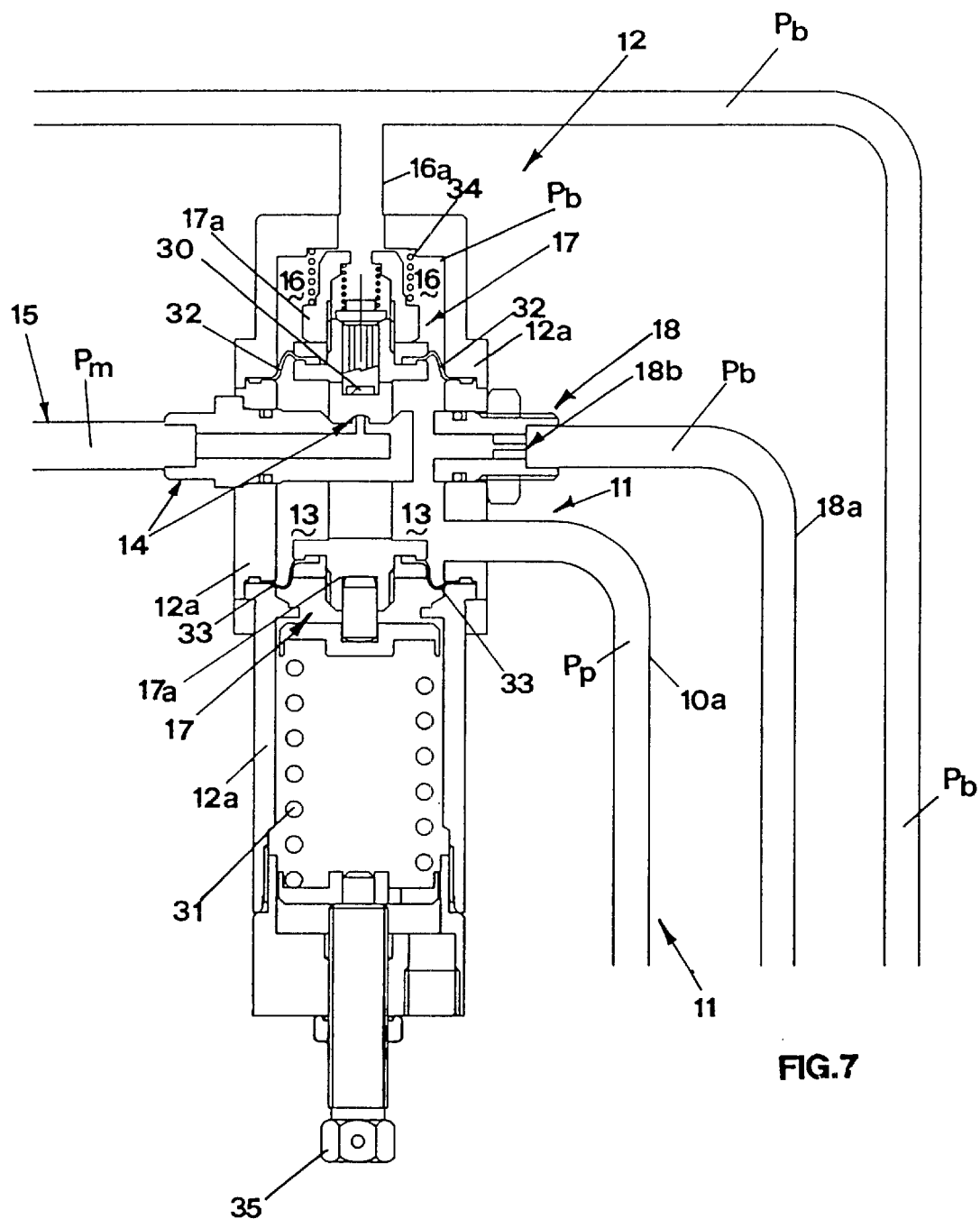

The pilot valve 12, shown in detail in FIGS. 6 and 7, is adapted to control the movement of the regulation shutter 5 and comprises a first chamber 13 with a first inlet way 14, a first outlet way 18 communicating with the delivery duct 4 and a second chamber 16 connected to the delivery duct 4.

More particularly in the second chamber 16 the plug of an interception shutter generally indicated with numeral 17 is arranged, adapted to open and close the inlet way 14 so as to allow the gas coming from the auxiliary duct 15 to enter the first chamber 13.

The invention provides that the first chamber 13 has a second outlet way 11 communicating through a pipe 10a with the lower chamber 10 and the upper chamber 9 and the inlet way 14 are connected to each other through a duct 9a to an auxiliary duct 15 containing gas at an intermediate pressure Pm between the high pressure Pa and the low Pb.

Figure 5:
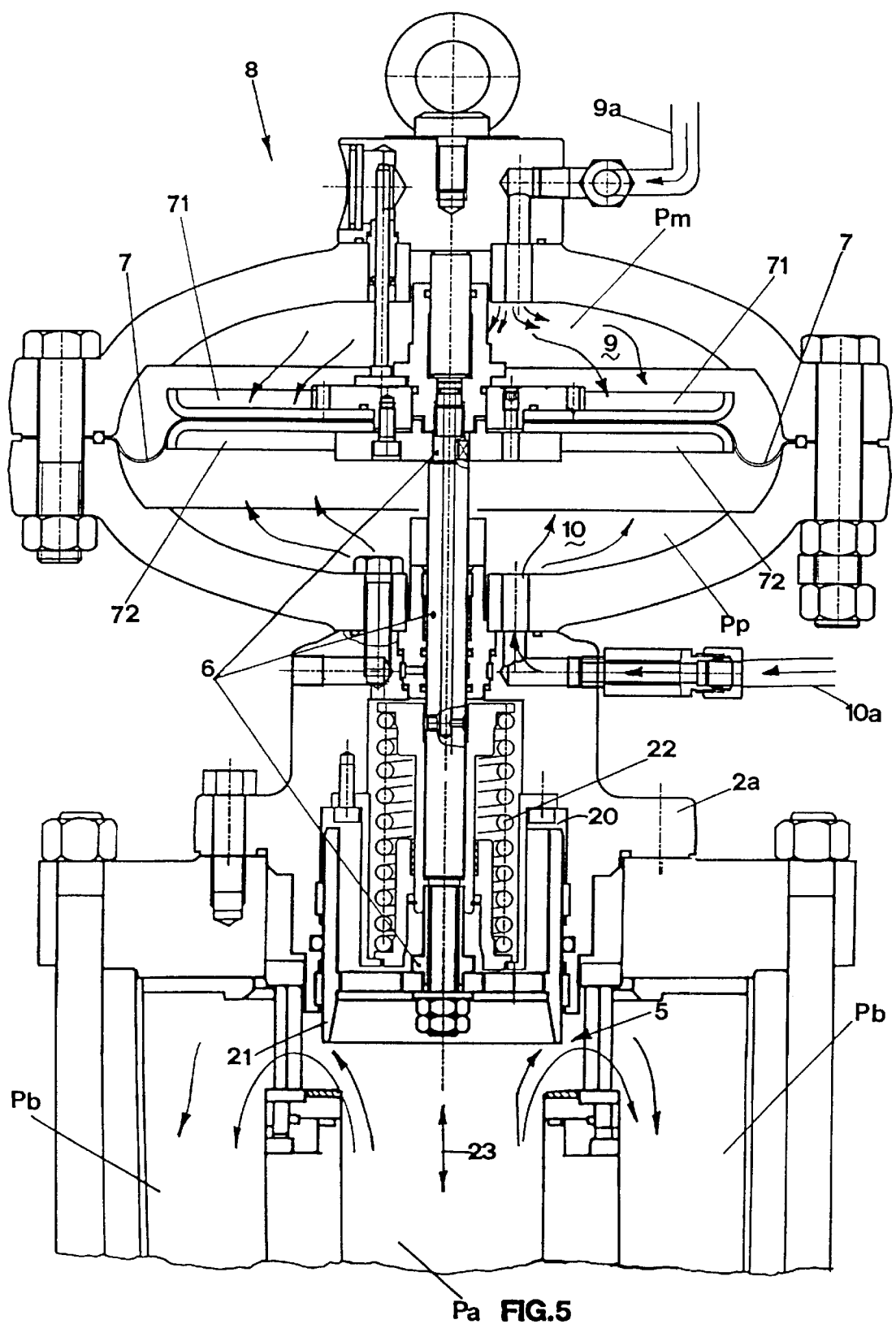

More particularly the regulation shutter 5 shown in detail in FIG. 5, is arranged in a chamber 20 made on the body 2a of regulator 2 and comprises a cylindrical movable baffle 21 fixed to the stem 6 and cooperating with elastic means consisting of a helical spring 22 causing the shutter to be elastically movable along the vertical direction indicated with numeral 23 to allow or prevent inflow of high pressure gas Pa to the delivery duct 4.

As already mentioned, the vertical movement of the shutter is controlled by the elastic membrane 7 arranged in the control head 8 and enclosed between two disks 71 and 72 on which the intermediate pressure Pm and the piloting pressure Pb are acting respectively.

Indeed if the force exerted by gas at pressure Pm on the upper disk 71 is greater than the sum of the force developed by the gas at pressure Pb and the elastic force generated by spring 22, the cylindrical baffle 21 goes down as shown in detail in Fig. So as to prevent inflow of high pressure gas Pa to the delivery duct 4.

Conversely if the sum of the force exerted by gas at pressure Pp and the elastic force of the spring is lower than the force exerted by the gas at pressure Pm, the baffle 21 goes up to the position indicated in FIG. 5 so as to allow inflow of high pressure gas Pa to the delivery duct 4.

As to the already mentioned plug of the interception shutter 17 shown in detail in FIGS. 6 and 7, it is arranged in a second chamber 16 defined by the body 12a of pilot valve 12 and comprises an oscillating body 17a vertically movable in chamber 16 being constrained to the body 12a through two annular elastic membranes 32 and 33.

At the top the plug is supported by upper elastic means consisting of a helical spring 34 and at the bottom by lower elastic means consisting of another helical spring 31 whose compression force is adjusted through an adjusting screw 35 so as to change the force acting on the shutter plug 17. This plug has also a pad 30 ensuring the sealing closure when the force exerted by pressure Pb of the delivery gas contained in chamber 16 is greater than the force generated by the helical spring 31.

It is important to note that in the second way 18 there is a throat 18b allowing lamination of gas contained in the first chamber 13 to the delivery duct 4 in case pressure Pp rises accidentally for instance because of an increase of temperature of the duct 10a.

A constructional variation may be different from the preceding one by having a throat 18 on the duct 18a instead of the outlet way 18.

For a correct operation of the pilot valve 12 it is necessary to carry out a calibration by acting on the screw 35 so that the inlet way 14 is intercepted by the shutter 17 when pressure Pb inside the second chamber 16 is coincident with the predetermined value of the delivery pressure Pb.

In this way a possible decrease of pressure Pb inside chamber 16 due to a greater demand of delivery gas, causes opening of the inlet way 14 and allows inflow of gas at the intermediate pressure Pm inside the first chamber 13.

As pressure Pm is always greater than pressure Pb, pressure of gas Pp contained in the outlet way 11 is substantially equal to pressure Pm and gas contained in chamber 13 is laminated through the throat 18a to the delivery duct 4.

Therefore a decrease of pressure Pb of the delivery gas causes an outflow on duct 10a of gas at a pressure Pp substantially equal to pressure Pm that reaching the lower chamber 10 of the control head 8, causes opening of the regulation shutter 5 and consequently an increase of pressure Pb of the delivery gas.

Conversely an increase of pressure Pb of the delivery gas will cause gas contained in the outlet way 11 to be at a pressure Pp equal to the pressure of the delivery gas Pb that reaching the lower chamber 10 of the control head, being lower than pressure Pm existing above the membrane, will cause the regulation shutter 5 to close and consequently a decrease of pressure Pb of the delivery gas.

It is important to note that a possible increase of temperature of the whole regulator 1 and more particularly of the duct 10a connecting the first chamber 13 and the lower chamber 10, does not involve any variation of the pressure Pb of the delivery gas.

Indeed in case of increase of temperature of the gas contained in duct 10a there is an increase of pressure Pp which is absorbed by the volume of downstream gas because of a spontaneous leakage through throat 18b.

In this way there is no loss of gas to the atmosphere as it occurs with the prior art.

Moreover the device of the invention reduces also the cost arising from the waste occurring in the prior art because the gas leakage is anyway conveyed to the user.

Figure 8:
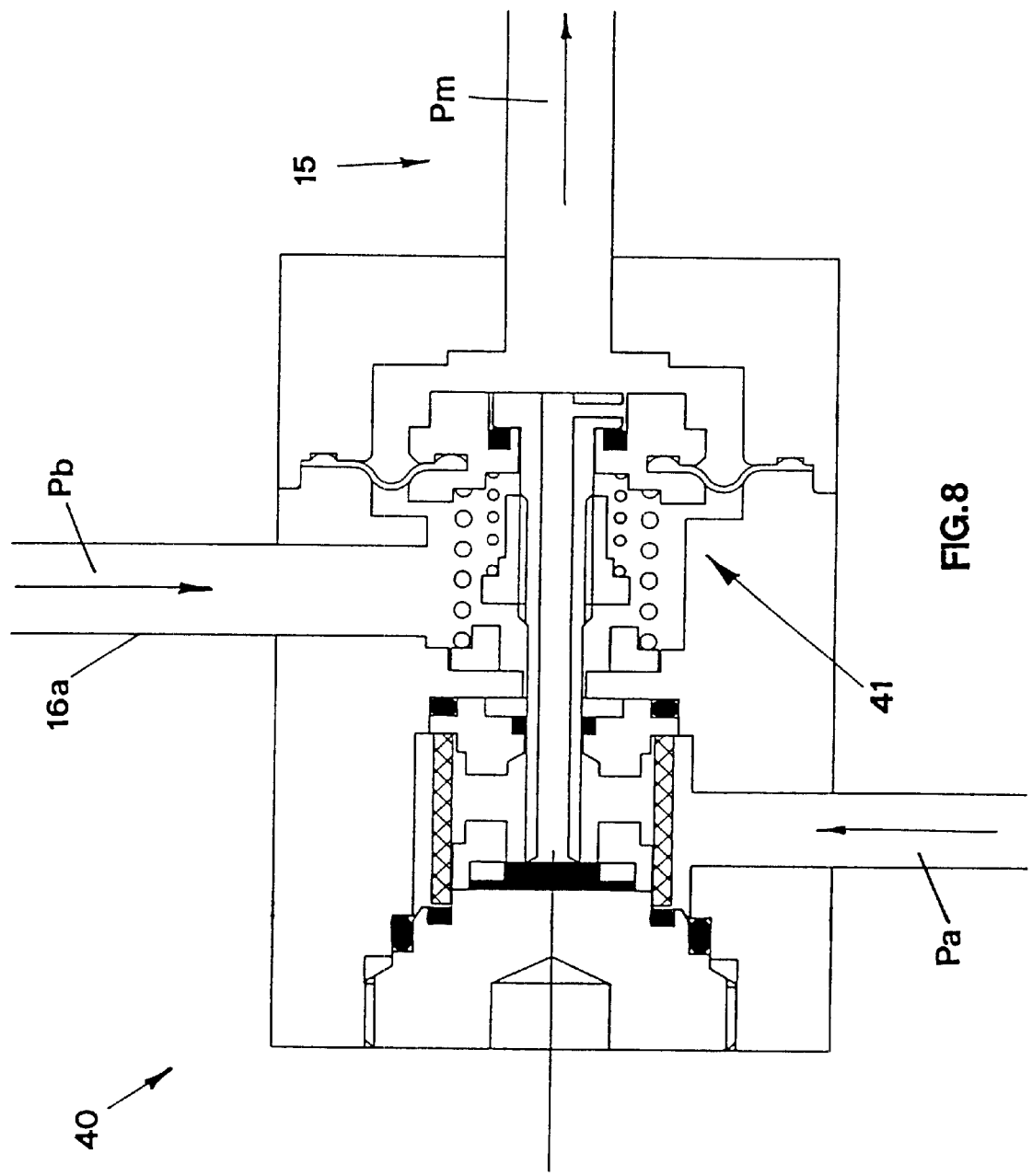
FIG. 8 is a sectional view of a further element of the unit of FIG. 3.

As to the auxiliary duct 15 supplying gas at an intermediate pressure Pm, said duct is connected to the outlet of an auxiliary regulator generally indicated with numeral 40 in FIG. 3 and shown also in detail in FIG. 8.

This regulator 40 of a type known per se, provides for opening the relief valve 41 when pressure Pm in the auxiliary duct 15 exceeds a threshold value set when calibrating said regulator 40.

More particularly an excessive increase of the difference of pressure between Pm and Pb will cause the relief valve 41 to open so as to discharge the gas from duct 15 to duct 16a connected to the delivery duct 4.

In this way the difference of pressure values Pm and Pb is always kept inside such a desired interval as not to damage membrane 7 of the control head 8 in case of wrong manipulations, leakage, temperature increase.

From the foregoing it is clear that the invention attains the intended objects.

Although the invention was described with reference to the accompanying sheets of drawings, it may undergo in the constructional stage, possible modifications anyway falling within the inventive scope and therefore to be considered covered by the present patent as set forth, in the appended claims.

What is claimed is:

1. A pressure regulator for a gas transport and/or distribution plant comprising:

at least a valve having an inlet duct for high pressure gas (Pa), at least a delivery duct for low pressure gas (Pb) and a regulation shutter for the gas delivery flow, slidingly supported by a stem fixed to an elastic membrane belonging to a control head of said valve and defining an upper chamber and a lower chamber in said valve;

at least a pilot valve for controlling the movement of said regulation shutter, said pilot valve defining a first chamber with an inlet way a first outlet way communicating with said delivery duct and a second chamber connected to said delivery duct in which the plug of an interception shutter adapted to open or close said inlet way is arranged;

wherein said first chamber has at least a second outlet way communicating with said lower chamber and said upper chamber and said inlet way are connected to each other through an auxiliary duct containing gas at an intermediate pressure (Pm) between said high pressure (Pa) and said low pressure (Pb).

2. The regulator of claim 1, wherein said second way has a throat adapted to allow lamination of gas contained in said first chamber to said delivery duct.

3. The regulator of claim 1, wherein said second way communicates with said delivery duct through a pipe.

4. The regulator of claim 3, wherein said pipe has at least a throat for lamination of gas contained in said chamber to said delivery duct.

5. The regulator of claim 1, wherein said upper chamber is connected to said auxiliary duct through a pipe.

6. The regulator according to claim 1, wherein said elastic membrane is enclosed between at least two disks on which said intermediate pressure (Pm) and the piloting pressure (Pp) is acting respectively.

7. The regulator according to claim 1, wherein said regulation shutter is arranged in a chamber made on the body of said regulator and comprises at least a movable baffle fixed to said stem and cooperating with elastic means causing the regulation shutter to move elastically along a generally vertical direction to allow or prevent inflow of high pressure gas (Pa) to said delivery duct.

8. The regulator according to claim 1, wherein said body of the interception shutter is arranged in a second chamber defined by the body of said pilot valve and comprising an oscillating body vertically movable in said chamber being constrained to said body through at least two annular elastic membranes.

9. The regulator according to claim 1, wherein said body of the interception shutter is supported at the top by upper elastic means and at the bottom by lower elastic means of which the compression force is adjusted through an adjusting screw in order to change the force acting on said body of shutter.

10. The regulator according to claim 1, wherein said body of the interception shutter comprises a pad closing or opening said inlet way when the force exerted by said pressure (Pb) of the delivery gas contained inside said second chamber is greater than the force generated by said lower elastic means.

11. The regulator according to claim 1, wherein said auxiliary duct is connected to the outlet of an auxiliary regulator.

* * * * *